United States Patent [19]

Kubokawa

[11] 4,371,043
[45] Feb. 1, 1983

[54] VIBRATION PREVENTION HANDLE FOR A VIBRATION DEVICE

[76] Inventor: Masaharu Kubokawa, 11-8, Minaminagasaki 3-chome, Toshima-ku, Tokyo, Japan

[21] Appl. No.: 242,428

[22] Filed: Mar. 11, 1981

[30] Foreign Application Priority Data

Mar. 13, 1980 [JP] Japan ................................. 55-31918

[51] Int. Cl.³ .............................................. B25G 1/00
[52] U.S. Cl. ............................. 173/162 H; 267/137; 248/560
[58] Field of Search ........ 173/162 R, 162 H, DIG. 2; 248/560, 638; 267/137; 51/170 T; 74/551.9

[56] References Cited

U.S. PATENT DOCUMENTS

| 972,548 | 10/1910 | Levedahl | 267/137 X |
| 2,062,817 | 12/1936 | Noble | 173/162 |
| 2,101,869 | 12/1937 | Noble | 173/162 X |
| 2,531,800 | 11/1950 | Anderson | 173/162 H |
| 2,831,463 | 4/1958 | Ekstrom et al. | 173/162 H |
| 3,292,884 | 12/1966 | Scheldorf | 248/560 |
| 3,531,069 | 9/1970 | Dabberley | 248/638 X |

FOREIGN PATENT DOCUMENTS

| 473694 | 7/1927 | Fed. Rep. of Germany | 74/551.9 |
| 477290 | 12/1937 | United Kingdom | 74/551.9 |

Primary Examiner—Stephen G. Kunin
Assistant Examiner—Robert P. Olszewski
Attorney, Agent, or Firm—McAulay, Fields, Fisher, Goldstein & Nissen

[57] ABSTRACT

A vibration prevention handle for a vibration device which can effectively prevent vibration and shock generated from a vibration device. The vibration prevention handle according to the present invention comprises a small-diameter close-coiled and larger diameter open-coiled helical spring, in addition to the conventional handle used with a vibration device. The one end of the helical spring is fixedly fitted to the handle, and the other end thereof is loosely fitted to the handle through a resin-made sleeve.

11 Claims, 6 Drawing Figures

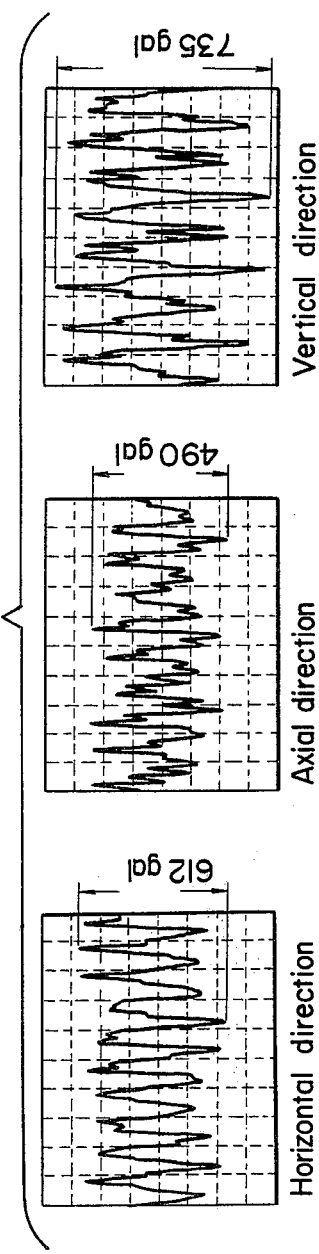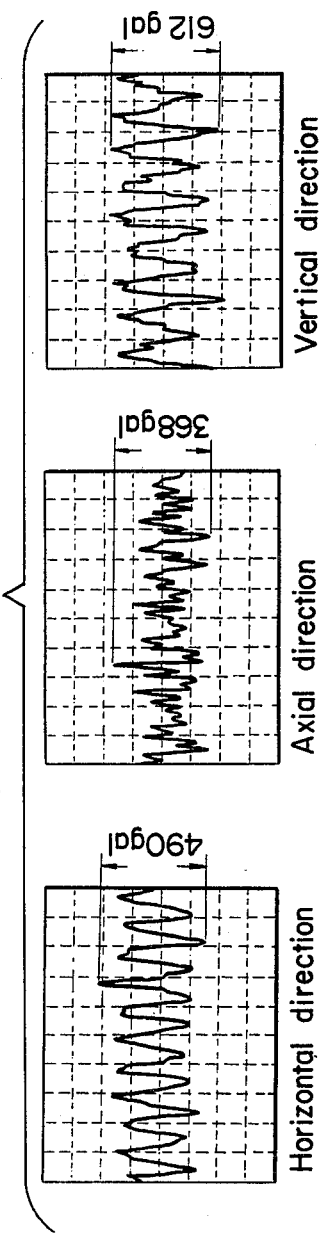

VIBRATION PREVENTION HANDLE FOR A VIBRATION DEVICE

BACKGROUND OF THE INVENTION

1. Field of the Invention

The present invention relates generally to a vibration device, for example, such as a disk grinder, and more specifically to a vibration prevention handle used for the vibration device such that a small-diameter close-coiled and larger-diameter open-coiled helical spring is loosely fitted to the handle of the vibration device for prevention of the worker from its vibration and shock.

2. Description of the Prior Art

In a conventional vibration device, for example, such as a disk grinder, a handle or a grip is usually provided on either side thereof, as shown in FIG. 1. In this case, the disk grinder is supported by the worker when he grips the handle 2' by his left hand and the rear side portion 2 by his right hand or vice versa, and is used by the worker when he puts the rotating grinder wheel 3 onto a work piece under an appropriate pressure while moving the grinder right and left or back and forth.

In the prior-art disk grinder as described hereinabove, however, since the grinder wheel's grind angle (an angle between the grinder wheel surface and the work piece surface which has already been ground by the grinder wheel) changes according to the finished profile of the work piece, for instance, in the case of plane finish, the grinder wheel is moved in parallel with the finished surface of the work piece; in the case of the finishing or cutting of an external circumference or an angled surface of an axle, the grinder wheel is required to be handled with an appropriate grind angle. In addition, since the disk grinder ranges from 6 to 7 kg in total weight and the grinder wheel rotates from 6000 to 7000 rpm, a considerably strong vibration and shock is generated and is given to the worker through the handle, accompanying a centrifugal force, whenever the grinder is used for grinding work.

Because no effective countermeasures have been taken until now against such vibration and shock, the conventional disk grinder handle gives an unbalanced weight feeling of vibration and shock to the worker's hand or arm especially when the grinder is used with the grind angle changed by the worker, thus resulting in an occupational disease like vibration disease or Raynaud's disease (which occurs only in a user of the vibration devices). Without limiting the above-mentioned disk grinder, such disease inevitably occurs a worker uses an electromotive hammer, an impact wrench, an airmotive concrete breaker, etc.

The above-mentioned vibration disease has symptoms as follows:

(1) circulation trouble of the blood at the hand or arm to which vibration is directly applied;
(2) function trouble of the central nerve;
(3) trouble of the bones and joints.

BRIEF SUMMARY OF THE INVENTION

With these problems in mind, therefore, it is the primary object of the present invention to provide a vibration prevention handle for a vibration device such that vibrations and shocks generated from a vibration device can effectively damped through a special helical spring in dependence upon the elasticity thereof.

The vibration prevention handle according to the present invention comprises a small-diameter close-coiled and large-diameter open-coiled helical spring, one end of which is loosely fitted to a fixed handle, the other end of which is fixedly fitted to the fixed handle.

In addition to the above structure, in the helical spring according to the present invention, a parallel rod portion formed by bending one end of the helical spring is provided in parallel with the axis of the handle along the outer peripheral surface of the helical spring, in order to prevent the worker's hand from being slipped in the circumferential or axial direction of the helical spring.

BRIEF DESCRIPTION OF THE DRAWINGS

The features and advantages of the vibration prevention handle for a vibration device according to the present invention will be more clearly appreciated from the following description taken in conjunction with the accompanying drawings in which like reference numerals designate corresponding elements, and in which:

FIG. 4(a) is graphical representations showing the maximum acceleration of a prior-art handle measured in three directions (axial, horizontal and vertical);

FIG. 4(b) is graphical representations showing the same maximum acceleration of the handle according to the present invention.

DETAILED DESCRIPTION OF THE A PREFERRED EMBODIMENT

Figure 2:
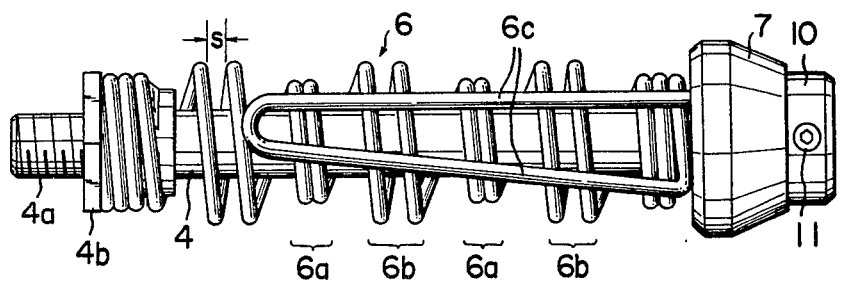
FIG. 2 is a plan view showing an example small-diameter close-coiled and larger-diameter open-coiled helical spring according to the present invention.
Figure 3:
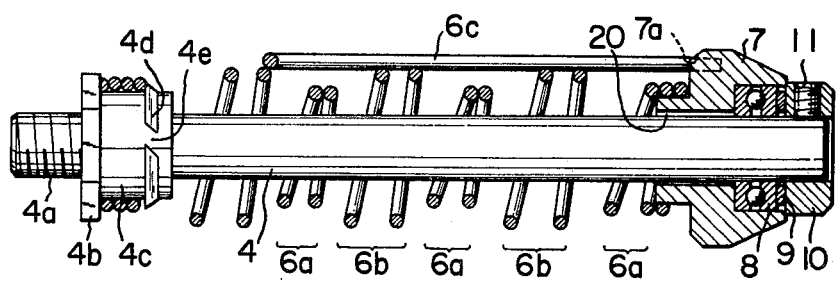
FIG. 3 is a cross sectional view of FIG. 2.

With reference to the accompanied drawings, there is explained an embodiment of the present invention. FIGS. 2 and 3 show an example vibration prevention handle according to the present invention. In these figures, the reference numeral 4 denotes a handle axle (fixed axle) screwed into a handle-fixing threaded hole on a vibration device such as a disk grinder. The handle axle 4 has a threaded portion 4a screwed into the threaded hole and a hexagon-shaped flange portion 4b with which a wrench is engaged to rotate the axle. The numeral 6 denotes a helical spring loose-fitted to the outer circumference of the handle axle 4. The helical spring is formed in such a way that small-diameter close-coiled helical spring portion 6a and larger-diameter open-coiled helical spring portions 6b with an appropriate pitch S are formed alternately; that is to say, the outer diameter of the helical spring 6 changes so as to form some variable diameter portions. The end of the small-diameter close-coiled helical spring 6 is pressure-fitted and fixed to a fitting portion 4c provided near the flange portion 4b of the handle axle 4. On the outer circumferential surface of this fitting portion 4c, a tapered stop projection 4d is provided with a larger diameter on the flange side, in order to prevent the helical spring 4 fitted to the fitting portion 4c from falling off. In addition, a cutout portion 4e is provided at a part of the tapered stop projection 4d, so that one end of the helical spring is forcedly passed through this cutout 4e when being rotated over the fitting portion 4c until the helical spring is brought into contact with the flange 4b.

As shown in FIG. 2, the right end of the helical spring 6 is bent straight along and approximately in parallel with the outer circumference of the handle axle 4 extending toward the handle fitting side (left side in FIG. 2) and is returned back toward the right end of the helical spring 6 from the halfway thereof so as to form a parallel rod portion 6c. The end of the parallel rod portion 6c is inserted into a locking hole 7a provided on the end surface of a resin-made sleeve 7 rotatably fitted to the (right side) end of the handle 4. Further, the right side end of the helical spring 6 is brought into contact with the left side surface of the sleeve 7, and a thrust bearing 8 is provided in the sleeve 7. The thrust bearing 8 is assembled under a bias pressure by a set collar 10 through a washer 9. In other words, the helical spring 6 is assembled to the handle axle 4 is a state where an appropriate compression force is previously being applied. The set collar 10 is fixed to the end of the handle axle 4 by the use of a set screw 11. Further, in this embodiment, a number of grooves 20 are provided in the axial direction on the inner circumferential surface of the sleeve 7 to improve the damping characteristics of the sleeve 7 against vibration and shock by reducing the friction loss produced between the sleeve 7 and the handle axle 4.

FIG. 4(a) shows example graphical representations showing the maximum acceleration (gal) of a prior-art handle in three direction (horizontal, axial and vertical), when the handle is used with a disk grinder. FIG. 4(b) shows example graphical representations showing the maximum acceleration (gal) of the novel handle according to the present invention in the same three direction when used with the same disk grinder.

These acceleration data are measured by fixing an acceleration measuring instrument on the handle of a disk grinder.

As is well understood, FIGS. 4(a) and 4(b) indicate that the peak-to-peak vibration acceleration of $A\omega^2$ (where A is amplitude and $\omega$ is angle velocity) generated from the handle according to the present invention are smaller than those from the prior-art handle in every direction.

Figure 1:
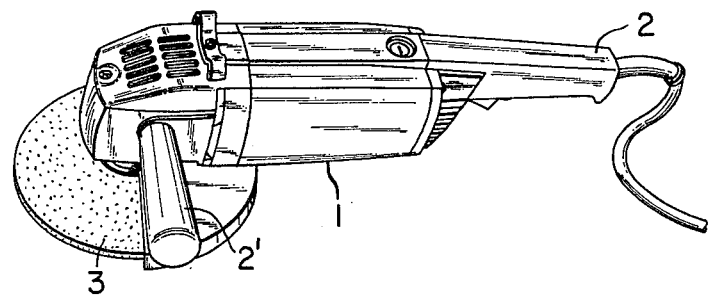
FIG. 1 is a perspective view showing a prior-art disk grinder as an example vibration device.
Figure 5:
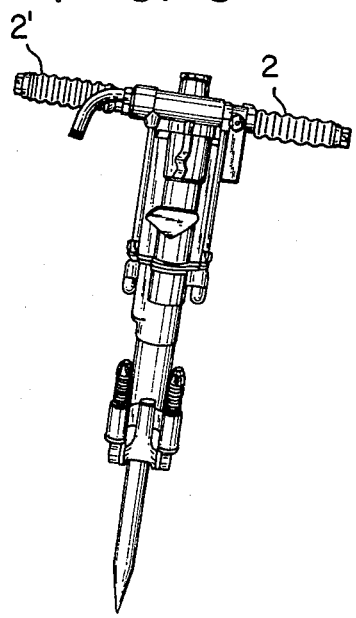
FIG. 5 is a perspective view showing an example hard hammer to which the handle of the present invention is applied.

FIG. 5 shows a state where the handle of the present invention is bitted to a hard hammer. In this embodiment, two handles 2 and 2' constructed as described hereinabove with rubber covers attached thereon are screwed into the respective handle fitting holes provided on both the sides of the hammer body 12.

As described above, in the vibration prevention handle constructed according to the present invention, since vibration and shock generated from a vibration device body like a grinder body is effectively damped, it is possible to protect the worker's hand or arm from vibration disease. Additionally, the variable outer diameter of the helical spring can prevent the hand from being slipped in the axial direction thereof; the parallel rod portion formed by bending the one end of the helical spring can prevent the hand from being slipped in the circumferential direction thereof and assure a more tight grip; the helical spring, one end of which is rotatably fixed to the sleeve, can prevent the hand from being slipped from the grip position and assure a more stable grip because the sleeve can rotate following the helical spring, even if a tortional force is applied to the handle axis while at work. Therefore, it is possible to reduce the fatigue of the worker, to asure a much safer work, thus promoting the work productivity and work quality.

The vibration prevention handle according to the present invention is usable with a superior damping characteristics for various vibration devices which generate vibration and shock, such as an electromotive hammer, an impact wrench, an airmotive concrete breaker, etc. as well as the disk grinder.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A vibration prevention handle for a vibration device, which comprises:
   (a) a handle fixed to a vibration device;
   (b) a small-diameter close-coiled and larger-diameter open-coiled helical spring provided so as to cover said handle, one end of said helical spring being freely rotatably mounted to said handle, the other end of said helical spring being fixedly mounted to said handle,
   whereby vibration and shock generated from the vibration device can be effectively damped.

2. A vibration prevention handle for a vibration device as set forth in claim 1, wherein said handle comprises:
   (a) a flange for supporting one end of said helical spring; and
   (b) a tapered stop projection with a cutout for fixedly supporting said helical spring on one side of said handle, said helical spring being forcedly passed through the cutout while being rotated until said helical spring is brought into contact with said flange.

3. A vibration prevention handle for a vibration device as set forth in claim 1, wherein said helical spring comprises at least one larger-diameter open-coiled helical spring portion.

4. A vibration prevention handle for a vibration device as set forth in claim 1, wherein said helical spring comprises a parallel rod formed by bending one end of said helical coil in parallel with the axis of said handle along the outer peripheral surface of said helical spring, whereby the worker's hand is prevented from being slipped in the circumferential and axial direction of said helical spring.

5. A vibration prevention handle for a vibration device as set forth in claim 4, which further comprises a sleeve for freely rotatably mounting said helical spring to said handle, said sleeve being rotatably fitted to said handle on one side of said handle, the smaller diameter cylindrical portion of said sleeve being inserted into the inner space of said helical spring, the end of said parallel rod being fixed to a hole provided on said sleeve.

6. A vibration prevention handle for a vibration device as set forth in claim 5, which further comprises a thrust bearing for reducing the friction between said sleeve and said handle, said thrust bearing being used inserted within said sleeve.

7. A vibration prevention handle as set forth in claim 5, wherein said sleeve is made of resin.

8. A vibration prevention handle as set forth in claim 6, which further comprises a set collar for fixing one side of said thrust bearing.

9. A vibration prevention handle as set forth in claim 1, wherein said helical spring is provided covering said handle so that an appropriate compression force is applied to said helical spring.

10. A vibration prevention handle as set forth in claim 2, wherein said handle is provided with a threaded portion whereby said handle is fixedly fitted to the body of a vibration device.

11. A vibration prevention handle as set forth in claim 2, wherein said flange is hexagonal in shape for allowing easy mounting of said handle to the vibration device by the use of a wrench.

* * * * *